(12) United States Patent
Wilson et al.

(10) Patent No.: US 6,601,393 B2
(45) Date of Patent: Aug. 5, 2003

(54) METHOD AND DEVICE FOR MODULATION OF A FLAME

(75) Inventors: Kenneth J. Wilson, Ridgecrest, CA (US); Kenneth H. Yu, Potomac, MD (US); Timothy Parr, Ridgecrest, CA (US); Klaus C. Schadow, San Clemente, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/308,985

(22) Filed: Dec. 3, 2002

(65) Prior Publication Data

US 2003/0074902 A1 Apr. 24, 2003

Related U.S. Application Data

(62) Division of application No. 09/853,930, filed on May 7, 2001, now Pat. No. 6,530,228.

(51) Int. Cl.⁷ .................................................. F02C 5/00
(52) U.S. Cl. .................. 60/776; 60/746; 60/39.281; 60/39.76; 431/1
(58) Field of Search ................ 60/776, 725, 39.281, 60/746, 39.76, 39.81; 431/1, 114

(56) References Cited

U.S. PATENT DOCUMENTS

| | | | | |
|---|---|---|---|---|
| 3,053,047 A | * | 9/1962 | Bodemuller | 60/39.281 |
| 3,851,462 A | * | 12/1974 | Vranos | 60/776 |
| 4,557,106 A | * | 12/1985 | Ffowcs Williams et al. | 60/725 |
| 5,349,811 A | * | 9/1994 | Stickler et al. | 60/776 |
| 5,361,710 A | * | 11/1994 | Gutmark et al. | 431/1 |
| 5,428,951 A | * | 7/1995 | Wilson et al. | 60/776 |
| 5,456,594 A | * | 10/1995 | Yap | 431/1 |
| 5,533,329 A | * | 7/1996 | Ohyama et al. | 60/773 |
| 5,636,507 A | * | 6/1997 | Rajamani et al. | 60/773 |
| 5,706,643 A | * | 1/1998 | Snyder et al. | 60/776 |
| 5,791,889 A | * | 8/1998 | Gemmen et al. | 431/1 |
| 5,797,266 A | * | 8/1998 | Brocard et al. | 60/725 |
| 5,809,769 A | * | 9/1998 | Richards et al. | 60/776 |

\* cited by examiner

*Primary Examiner*—Ted Kim
(74) *Attorney, Agent, or Firm*—Laura R. Foster

(57) ABSTRACT

This invention relates to air breathing engines, such as ramjets, scramjets and internal combustion, and more particularly to an active combustion control device for a combustor. In more particularity, the present invention relates to a method and apparatus that applies active combustion control technology to advanced propulsion devices and closed-loop fuel injection at sub-harmonic frequencies of the instability frequency of the combustor. The problem of limited actuator frequency response is addressed by injecting fuel pulses at sub-harmonic frequencies of the instability. The fuel may be liquid, solid or gas. To achieve this desired result, a closed loop controller is designed to determine sub-harmonic frequencies using a divider to divide the instability frequency of a combustor, yielding a fraction of the harmonic frequency. Also, this invention also combines open loop injection control with closed loop injection control to obtain enhanced engine performance, which includes extension of the stable combustion zone.

16 Claims, 5 Drawing Sheets

METHOD AND DEVICE FOR MODULATION OF A FLAME

This application is a Divisional Application of U.S. patent application Ser. No. 09/853,930, filed May 7, 2001, now U.S. Pat. No. 6,530,228

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

This invention relates to air breathing engines and more particularly to an active combustion control device for an air breathing engine combustor. In more particularity, the present invention relates to a device that applies active combustion control technology to advanced propulsion devices and closed-loop fuel injection at sub-harmonic frequencies of the instability frequency of the combustor. Also, the present invention relates to active combustion control with a combination of open loop fuel injection and closed loop fuel injection.

2. Description of the Related Art

Many propulsion systems, such as those used in various tactical missile systems, involve an enclosed combustor. There are two basic methods for controlling combustion dynamics in a combustion system: passive control and active control. As the name suggests, passive control refers to a system that incorporates certain design features and characteristics to reduce dynamic pressure oscillations. Active control, on the other hand, incorporates a sensor to detect, e.g., pressure fluctuations and to provide a feedback signal which, when suitably processed by a controller, provides an input signal to a control device. The control device in turn operates to reduce the dynamic pressure oscillations.

The combustion characteristics of an enclosed combustor, including flammability limits, instability, and efficiency are closely related to the interaction between shear flow dynamics of the fuel and air flow at the inlet and acoustic modes of the combustor. Strong interaction, between the acoustic modes of the combustor and the airflow dynamics may lead to highly unstable combustion. Specifically, unstable combustion may occur when the acoustic modes of the combustor match the instability modes of the airflow. For such conditions, the shedding of the airflow vortices upstream of the combustor tends to excite acoustic resonances in the combustion chamber, which subsequently cause the shedding of more coherent energetic vortices at the resonant frequency. The continued presence of such vortices provides a substantial contribution to the instability of the combustion process. For a more thorough discussion, please refer to U.S. Pat. No. 5,361,710 issued to Gutmark et al. on Nov. 8, 1994, which is incorporated herein by reference.

In a jet of fluid that exits from a conduit to a surrounding medium of another fluid, sudden increase of the mass-flow leads to formation of well-defined vortices that dominate the boundary between the jet fluid and the surrounding fluid. Because these vortices help transport chunks of fluid over a large distance, the rate of turbulent mixing between the two fluids is closely linked to the dynamics of these vortices. One way to manipulate the dynamics of vortices is to modulate periodically the instantaneous mass-flux of the jet.

In combustion devices, actuators can be used to enhance combustion performance such as efficiency improvement, pollutant reduction, flammability extension, and instability suppression. Combustion apparatuses, which use actuators, have been disclosed in U.S. Pat. No. 5,428,951 issued to Wilson et al. on Jul. 4, 1995, which is incorporated herein by reference. The '951 Patent discloses several active control devices, including loudspeakers to modify the pressure field of the system or to obtain gaseous fuel flow modulations, pulsed gas jets aligned across a rearward facing step, adjustable inlets for time-variant change of the inlet area of a combustor, and solenoid-type fuel injectors for controlled unsteady addition of secondary fuel into the main combustion zone.

The periodic shedding of vortices produced in highly sheared gas flows has been recognized as a source of substantial acoustic energy for many years. For example, experimental studies have demonstrated that vortex shedding from gas flow restrictors disposed in large, segmented, solid propellant rocket motors couples with the combustion chamber acoustics to generate substantial acoustic pressures. The maximum acoustic energies are produced when the vortex shedding frequency matches one of the acoustic resonances of the combustor. It has been demonstrated that locating the restrictors near a velocity antinode generated the maximum acoustic pressures in a solid propellant rocket motor, with a highly sheared flow occurring at the grain transition boundary in boost/sustain type tactical solid propellant rocket motors.

An apparatus and method for controlling pressure oscillations caused by vortex shedding is disclosed is in U.S. Pat. No. 4,760,695 issued to Brown, et al. on Aug. 2, 1988. The '695 patent discloses an apparatus and method for controlling pressure oscillations caused by vortex shedding. Vortex shedding can lead to excessive thrust oscillations and motor vibrations, having a detrimental effect on performance. This is achieved by restricting the grain transition boundary or combustor inlet at the sudden expansion geometry, such that the gas flow separates upstream and produces a vena contracta downstream of the restriction, which combine to preclude the formation of acoustic pressure instabilities in the flowing gas stream. Such an inlet restriction also inhibits the feedback of acoustic pressure to the point of upstream gas flow separation, thereby preventing the formation of organized oscillations. The '695 patent does not present a method or apparatus, which attempts to control pressure oscillations in a combustor by using sub-harmonic frequencies of the instability frequency of the combustor.

While there has been a renewed interest on active combustion control (ACC) stemming from increasingly restrictive requirements on gas turbine pollution, many of the earlier studies on ACC were motivated by the desire to improve combustion performance in rockets, ramjets, and afterburners. Past studies on active combustion control (ACC) have shown that it is possible to enhance combustion performance through fast-response closed-loop feedback control as described in McManus, K. R., Poinsot, T., and Candel, S. "A Review of Active Control of Combustion Instabilities," *Prog. In Energy and Comb. Sci.*, Vol. 19, 1993, pp. 1–29. The scope of earlier investigations, however, often remained relatively basic in nature making it difficult to transition such research results into a practical system. For a more detailed explanation, please refer to Yu, K. et al. "An Experimental Study on Actively Controlled Dump Combustors", NATO Active Control Symposium (Braunschweig, Germany, May 8–12, 2000), which is incorporated herein by reference.

Some of the previous studies in this area include instability suppression, efficiency improvement, flammability limit extension, and pollutant reduction. These studies have opened up the opportunity to study more practical issues related to potential implementation of ACC in real systems. Current research has studied the possibility of applying the active combustion control technology to advanced propulsion devices.

SUMMARY OF THE INVENTION

A preferred embodiment of the present invention involves a closed-loop liquid-fueled active control technique, which is applied in a dump combustor to enhance its combustion performance. The method and apparatus of the current invention incorporate the requirement of critical fuel flux, effects of fuel droplet size on control, and novel controller concepts. The critical fuel flux is dependent on the fuel droplet size and initial magnitude of the instabilities. When the fuel droplet size, $D_0$, is reduced in the controlled injection, the control efficiency for heat flux actuation increases significantly. Upon analysis, an exponential dependency on the droplet size is determined. For a moderate droplet Reynold number, the amplitude of controlled heat release for a given fuel amount was inversely proportional to the droplet size by a factor of $D_0^{-1.4}$.

A preferred embodiment of the present invention involves injecting fuel pulses at sub-harmonic frequencies of the instability, thus addressing the limited actuator frequency response. This embodiment of the method and apparatus applies ACC in an air breathing engine combustor. The method of active control modulation of a flame in a combustor by injecting pulsed fuel involves feeding fluid into the combustor through the combustor inlet. For the purposes of this invention, fluid may be air, liquid or gaseous fuel. Instabilities in the combustor produce natural oscillations in the fluid flow. These natural oscillations are manifestations the instability frequency of the combustor. Next, a sensor signal is generated which truly reproduces the pressure oscillations in the combustor at a given time. The pressure oscillations detected by the sensor truly reproduce the pressure oscillations that occur in the combustor at the time of sensing. The pressure oscillations detected by the sensor may merely be the natural oscillations produced by instabilities in the combustor or the pressure oscillations detected by the sensor may be the modulated oscillations. A closed loop control device operatively coupled to the actuator and responsive to the sensor determines the harmonic frequency of the instability frequency. One or more actuators inject the pulsed fuel into the shear layer of the combustor at sub-harmonic frequencies of said instability frequency. The natural oscillations are modulated by the pulsed fuel, which creates tailored conditions in the combustor.

Another preferred embodiment of the present invention utilizes both open-loop and closed-loop control schemes to obtain enhanced performance including extension of the stable combustion zone. This embodiment of the method and apparatus applies ACC in an air breathing engine combustor. Such combustors could be used in advanced ramjets, gas turbines, or afterburners. The method of this preferred embodiment involves active control modulation of a flame in a combustor having an instability frequency by injecting pulsed fuel through two or more actuators. The system includes at least one actuator coupled to closed loop control and at least one actuator coupled to the open loop control. The first step involves feeding fluid into the combustor through the inlet. Again, for the purposes of this invention, fluid may be air, liquid or gaseous fuel. Instabilities in the combustor produce natural oscillations in the fluid flow. These natural oscillations produce the instability frequency of the combustor. Next, a sensor signal is generated which truly reproduces the pressure oscillations. The pressure oscillations detected by the sensor truly reproduce the pressure oscillations that occur in the combustor at the time of sensing. The pressure oscillations detected by the sensor may merely be the natural oscillations produced by the combustor instabilities or the pressure oscillations detected by the sensor may be the modulated natural oscillations. A closed loop control device is operatively coupled to the closed loop actuators and is responsive to a sensor. The closed loop control device controls the amplitude of pressure oscillations in the combustor. An open loop control device is operatively coupled to the open loop actuators and the open loop control device drives these actuators at a driving frequency. The driving frequency is either harmonic or sub-harmonic of the instability frequency. The respective actuators periodically inject the pulsed fuel into the shear layer of the combustor.

An objective of a preferred embodiment of the present invention provides a sub-harmonic closed loop active combustion control device, which enables higher performance in dump combustors and as a result, enables the fuel to be burned more efficiently and provides increased thrust.

A further objective of a preferred embodiment of the present invention provides a sub-harmonic closed loop active combustion control technique which not only suppresses combustion instabilities but it could also be used to extend the lean flammability limit.

A further objective of a preferred embodiment of the present invention provides a sub harmonic closed loop active combustion control in which the instability amplitude increases with the combustor output scale.

A further objective of a preferred embodiment of the present invention provides an apparatus and method of sub-harmonic closed loop active combustion control, which is based on using a closed-loop fuel injection at sub-harmonic frequencies and provides a performance similar to that using the injection at the instability frequency.

A further objective of a preferred embodiment of the present invention provides a sub-harmonic closed loop active combustion control, which could be used to relax the requirements on actuators.

A further objective of a preferred embodiment of the present invention provides an active combustion control apparatus and method, which uses a combination approach bringing an open- and closed-loop controls simultaneously and acts as a pacemaker when there is a significant drift in the natural instability frequency.

A further objective of a preferred embodiment of the present invention provides an active combustion control apparatus and method that can suppress unwanted oscillations and extend the flammability limit. dr

DESCRIPTION OF THE DRAWINGS

Other objects, advantages, and novel features of the present invention will be apparent from the following detailed description when considered with the accompanying drawings wherein.

DETAILED DESCRIPTION OF THE INVENTION

Figure 1A:
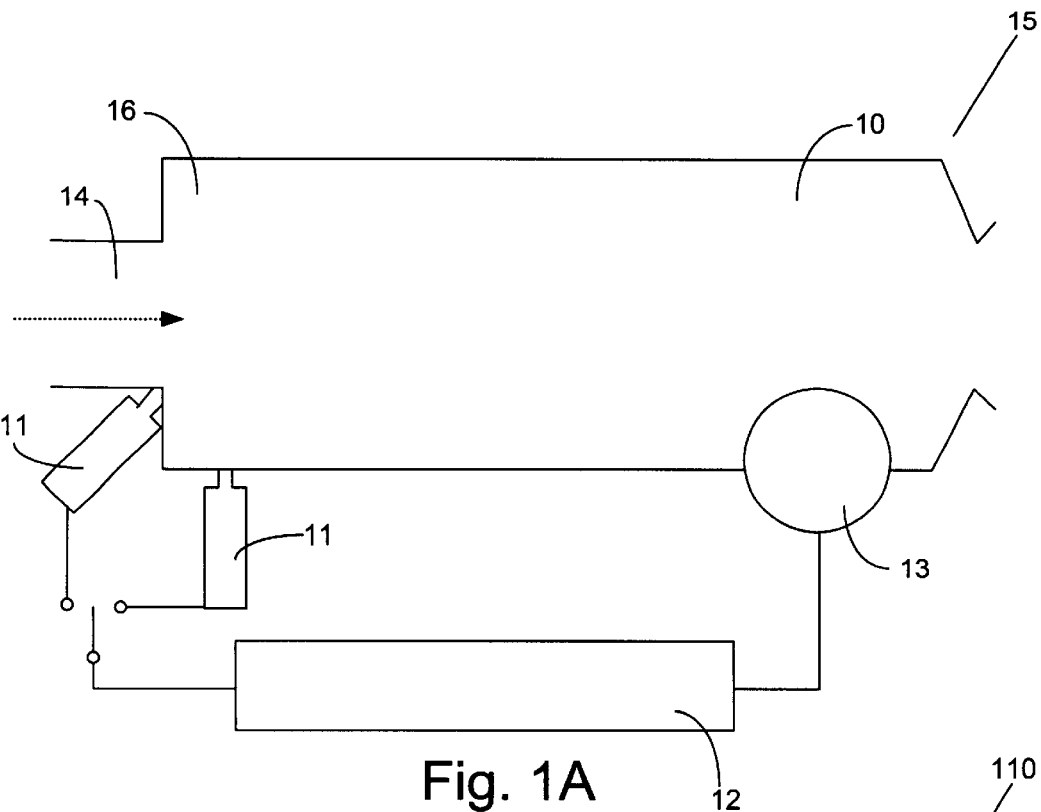
FIG. 1A is an illustration of an active control system of a preferred embodiment of the present invention which illustrates the active control system using at least one closed loop controller to prompt the actuators to inject fuel at sub-harmonic frequencies to the instability frequency.

The present invention is a method and apparatus for actively controlling an air breathing engine, such as a ramjet engine, scramjet engine or internal combustion engine, by utilizing sub-harmonic closed loop fuel injection. Preferably, the sub-harmonic closed loop method and apparatus employs at least one closed loop actuator 11, as illustrated in FIG. 1A. The closed loop actuators 11 or transducers are adapted for producing and stabilizing discrete, large scale vortices in the combustor 10 at sub-harmonic frequencies to the instability frequency of the combustor 10. This method and apparatus address the problem, which occurs when the maximum frequency response of available actuators 11 is lower than the combustion process one is trying to control. This problem often occurs in liquid fuel actuation, because many of the commercially available injectors have relatively low frequency response compared to the instability frequencies. However, the novel concepts detailed herein relate to fluid flow, wherein the fluid is any applicable medium where oscillations may occur, such as liquid, air or gaseous fuel. Further, the novel concepts herein may be incorporated into liquid or solid fuel air breathing engines.

Figure 1B:
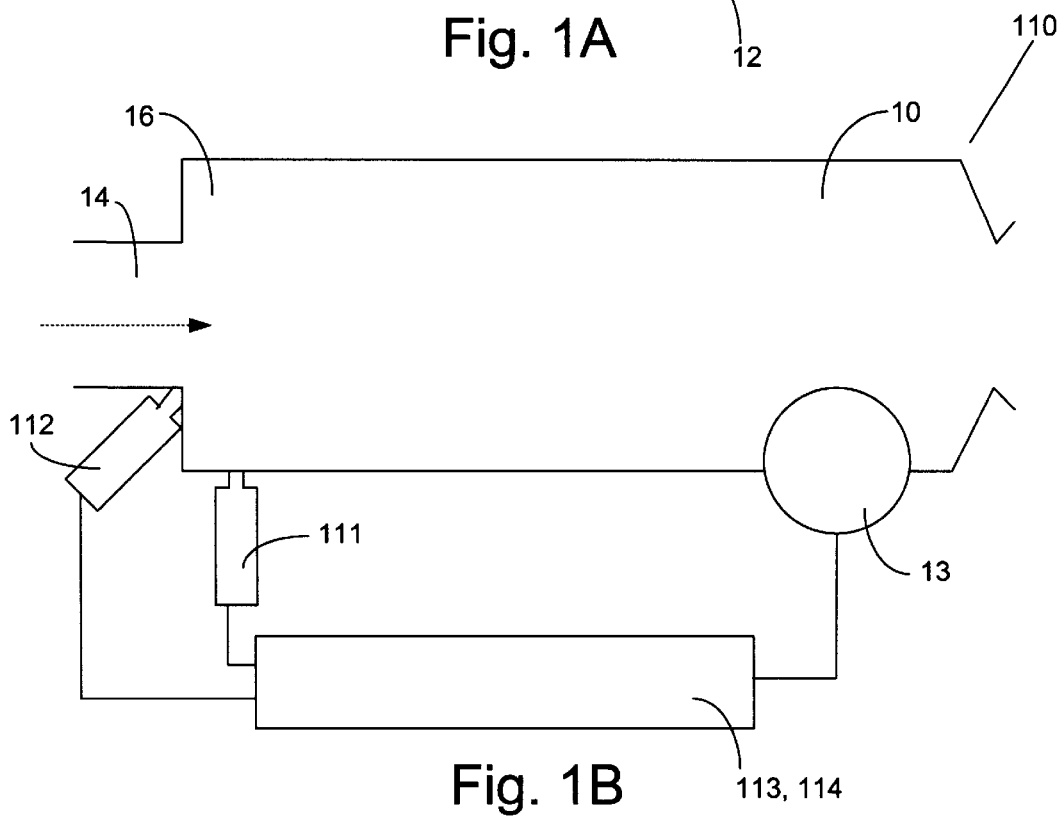
FIG. 1B is an illustration of an active control system a preferred embodiment of the present invention which illustrates the active control system using at least closed loop controller in conjunction with at least one open loop controller to prompt the respective actuators to inject fuel.
Figure 2A:
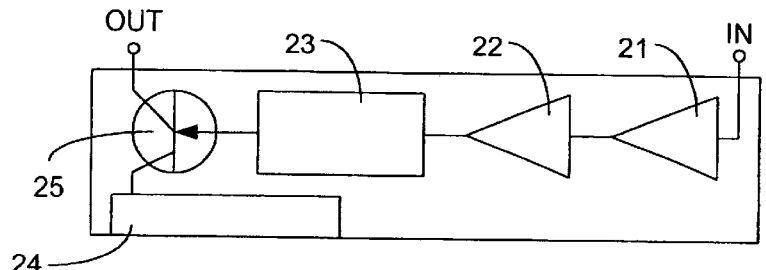
FIG. 2A is an illustration of a controller in an active control system known in the art.

A preferred embodiment of the present invention involves the use of actively controlled fuel injection at sub-harmonic frequencies, because the instabilities may occur at frequencies higher than the frequency response of the actuators. Referring to FIGS. 1A and 1B, instabilities in a combustor 10 cause natural oscillations. In order to reduce the negative effects of these oscillations, pulsed fuel injectors are used as actuators 11. For active instability suppression, one approach is to pulse the liquid fuel at the instability frequency of the combustor 10 and adjust the timing using a simple closed-loop circuit utilizing a bandpass filter 21, an amplifier 22, a phase lock and delay circuit 23, a power supply 24 and a transistor 25, as illustrated in FIG. 2A. It is common to apply active control using an actuator 11 with higher frequency response than the combustion dynamics. A problem occurs when the maximum frequency response of available actuators 11 is lower than the combustion process one is trying to control. This is often the case in liquid-fuel actuation as many of the commercially available injectors have relatively low frequency response compared to the instability frequencies. Because of an emphasis on extending active control to combustors, a phase-delay circuit is utilized instead of a more sophisticated controller, such as those based on an adaptive technique or model-based design approaches. However, the more sophisticated controllers could be utilized in the present invention.

Figure 2B:
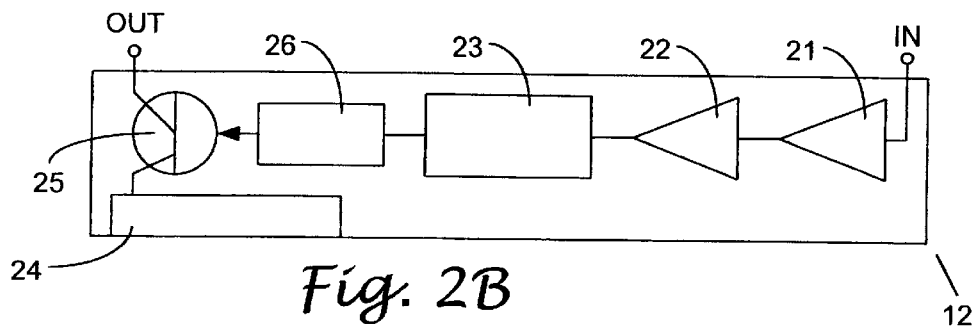
FIG. 2B is an illustration of a sub-harmonic closed loop controller of a preferred embodiment of the present invention.
Figure 2C:
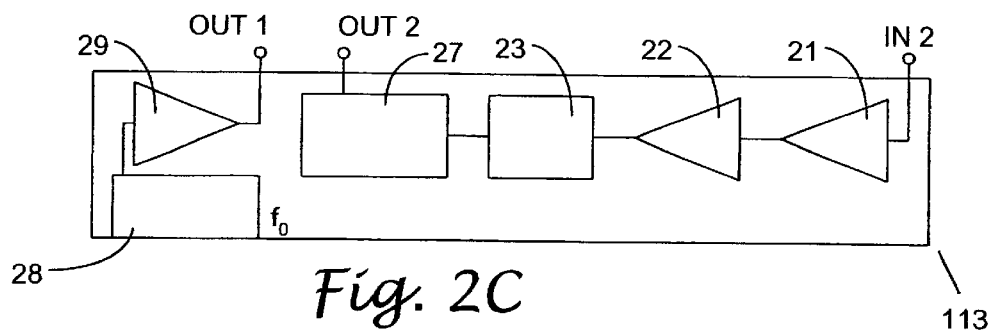
FIG. 2C is an illustration of a pacemaker controller of a preferred embodiment of the present invention.

FIGS. 2B and 2C show preferred embodiments of the present invention and the development of more practical controller circuits of the current invention. Referring to FIG. 2B, a divider 26 was added to the prior art circuit of FIG. 2A. This allows periodic injection of fuel, liquid or gas, at sub-harmonic frequencies of the instability frequency. This is particularly advantageous if the actuator 11 frequency response is limited in the low frequency range below the characteristic frequencies of the combustor 10.

Figure 2D:
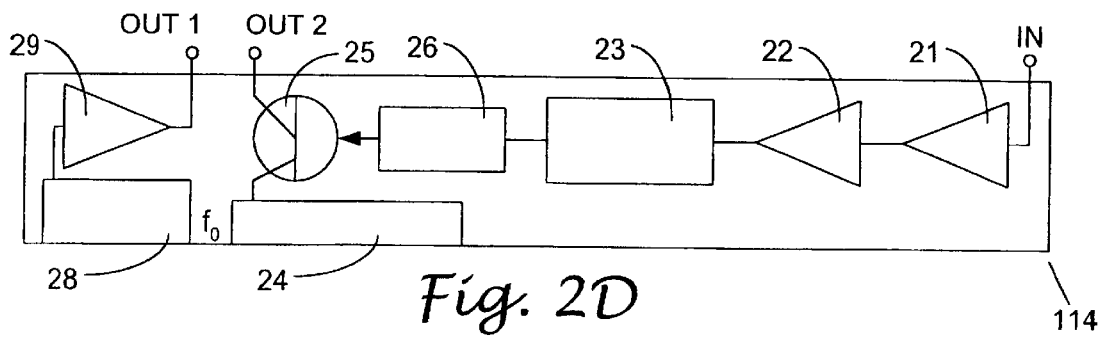
FIG. 2D is an illustration of a sub-harmonic closed loop controller used in conjunction with a pacemaker controller of a preferred embodiment of the present invention.

A preferred embodiment of the present invention includes at least one actuator 11, a controller 12, and a sensor 13, as illustrated in FIG. 1A. The sensor 13 is disposed in the combustor 10 downstream from the inlet 14 of the combustor 10. The sensor 13 is preferably a pressure transducer and is positioned so as to monitor the pressure oscillations in the combustor 10 at a given moment. The pressure oscillations monitored by the sensor 13 are the natural oscillations caused by the instabilities in the combustor 10 or the tailored conditions produced by the preferred embodiments of the present invention. The pressure measurements of the sensor 13 are then fed into the controller 12 which is adapted for receiving and processing this information, as illustrated in FIGS. 2B through 2D. The controller 12 is further operatively coupled to the vortex generating respective actuators 11 and thus monitors and controls the operating characteristics of the engine.

A preferred embodiment of the present invention provides an apparatus 15 for modulation of a flame by injecting pulsed fuel at sub-harmonic frequencies of an instability frequency of a liquid fuel combustor 10 having instabilities. These instabilities cause natural oscillations, which may be modulated by the apparatus 15. FIG. 1A shows an air breathing engine, including a combustor 10, and an inlet 14 to the combustor 10. At least one closed loop actuator 11 periodically injects pulsed fuel into the combustor 10 at sub-harmonic frequencies of the instability frequency. Preferably, the pulsed fuel is injected into the shear layer 16 of the combustor 10. A sensor 13 is operatively connected to the combustor 10 down stream from the inlet 14. The sensor 13 generates a sensor signal detecting pressure oscillations in the combustor 10. A means for controlling 12 is operatively coupled to the actuators 11 and responsive to the sensor 13. The means for controlling 12 prompts the actuator 11 to periodically inject the pulsed fuel at sub-harmonic frequencies to the instability frequency and the pulsed fuel modulates the natural oscillations of the combustor 10 to produce tailored conditions in the combustor 10.

Specifically, the means for controlling 12 utilizes the sensor 13 output values to actively control the frequency, phase shift, and magnitude of the vortex generating actuator output in order to generate the large scale, coherent vortices within the combustor 10. Further, the means for controlling 12 utilizes the combustor 10 pressure measurements, together with the vortex generating actuator 11 input signal to control the frequency, phase and rate of the fuel injection.

Referring to FIG. 2B, in a more preferred embodiment, the means for controlling is a closed loop controller, having a power supply 24 and transistor 25, operatively coupled to the actuators 11 and responsive to the sensor 13. A bandpass filter 21 is coupled to sensor 13. The sensor 13 relays the instability frequency to the bandpass filter 21 and the bandpass filter 21 identifies a frequency range containing this instability frequency. Typically, many frequencies may be present in the combustor 10. However, each combustor 10 has one dominant frequency, which primarily affects pressure oscillations in the combustor 10. This dominant frequency, which is detected by the sensor 13, is the instability frequency of the combustor 10. An amplifier 22 is coupled to the bandpass filter 21. A phase-lock and delay circuit 23 is coupled to the amplifier. The phase lock locks the instability frequency in phase and the delay delays processing of data for measurement. A divider 26 is coupled to the phase-lock and delay circuit 23. The divider 26 divides the instability frequency of the combustor 10, yielding a fraction of the harmonic frequency. From the harmonic frequency, sub-harmonic frequencies are then determined. The fuel pulses may be injected at any of the sub-harmonic frequencies of the instability frequency such as first sub-harmonic frequency, second sub-harmonic frequency, third sub-harmonic frequency, etc.

A preferred embodiment of the present invention includes four actuators. As illustrated in FIG. 1A, two of the four actuators 11 are set in at an angle of about 45° with respect to the incoming air flow 14 and two of the four actuators 11 are set at an angle of about 90° with respect to the incoming air flow 14. However, these angles are not to be considered limiting. Any number of actuators and angles may be incorporated to create the desired tailored conditions in the combustor 10.

Figure 3A:
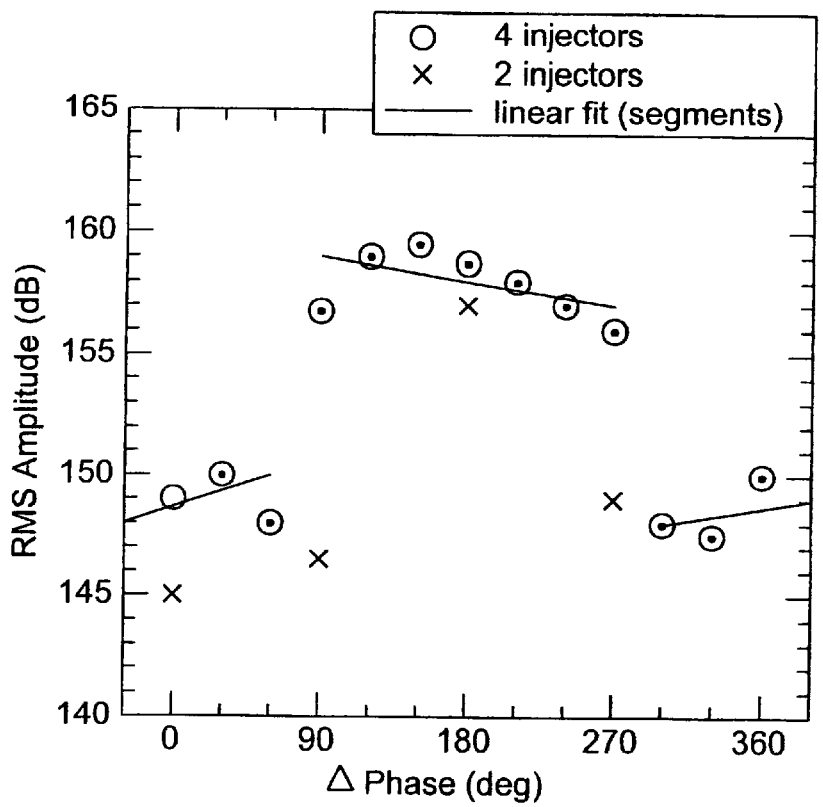
FIG. 3A is a graph that illustrates the performance of a conventional baseline controller using actuation at the instability frequency expressed in terms of amplitude of actively suppressed pressure oscillations as a function of controller electronic phase delay.
Figure 3B:
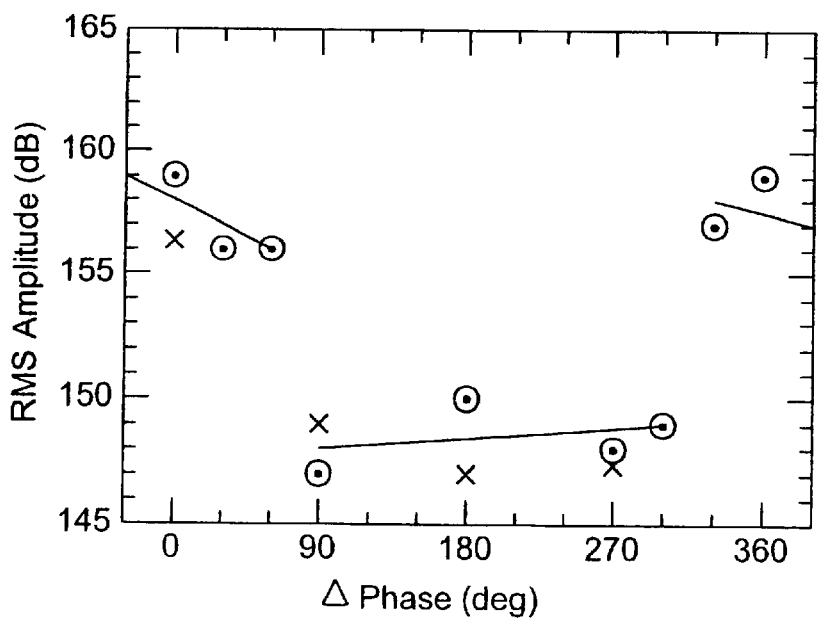
FIG. 3B is a graph that illustrates the performance of a preferred embodiment of the present invention using closed loop actuation at the first sub-harmonic frequency of instability expressed in terms of amplitude of actively suppressed pressure oscillations as a function of controller electronic phase delay.

The results are shown in FIG. 3A, which displays the pressure oscillation amplitude as a function of the controlled phase delay settings. The control was attempted either with four fuel injectors or two, but the duty cycle was adjusted so that the average fuel flow through the controller remained almost the same in each case. FIG. 3B shows that the closed-loop sub-harmonic control approach worked just as effectively. The results are encouraging in that there was no significant drop-off in the performance when compared with the baseline case of FIG. 3A, which used the controlled injection at the fundamental frequency. In both cases, there was more than 10dB suppression when the phase-delay was controlled properly.

Figure 5:
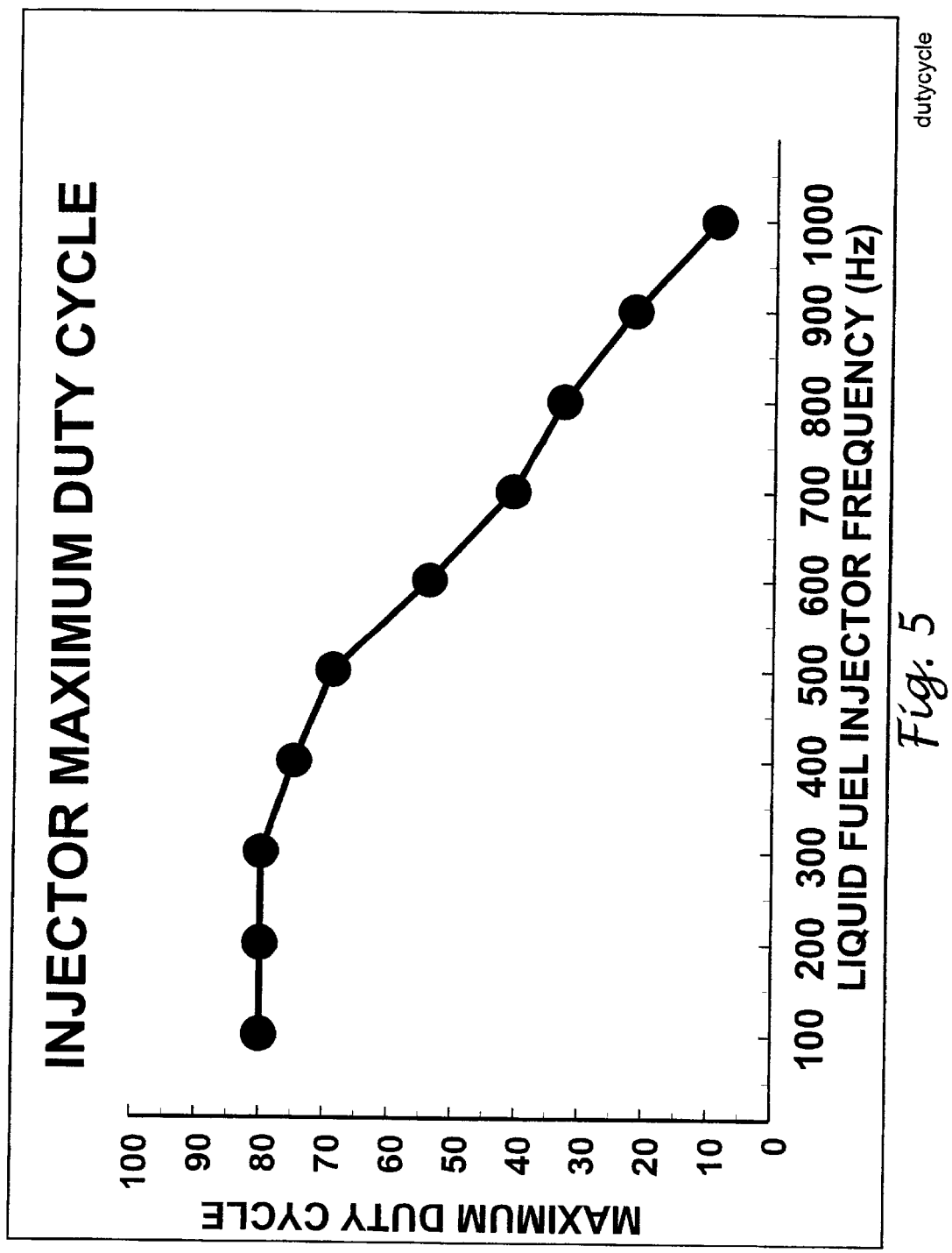
FIG. 5 is a graph that illustrates the duty cycle of a preferred embodiment of the present invention in terms of maximum duty cycle versus injector frequency.

FIG. 5 is a graph that illustrates the duty cycle in terms of maximum duty cycle versus liquid fuel injector frequency. The duty cycle decreases as the fuel injector frequency increases.

Another preferred embodiment of the present invention is based on establishing a controlled amount of oscillations by combining an open-loop injection control with a closed-loop control, to more effectively control the combustor dynamics over a wide range of operating conditions, phase-delay. This preferred embodiment may be used in conjunction with the previously disclosed sub-harmonic closed loop controller, as illustrated in FIG. 2D. Referring to FIG. 1B, the controller 114 of FIG. 2D is utilized in a system with at least two actuators 111 and 112 where the system incorporates at least one closed loop actuator 111 and at least one open loop actuator 112. The combination open loop controller and closed loop controller system is described in detail below.

A preferred embodiment uses two outputs, OUT 1 and OUT 2. One set of injectors 112 is driven with an open-loop, OUT 1, forcing to reinforce the periodic process, while the other set of injectors 111 is used for controlling the combustion process. In general the open-loop forcing frequency is selected either same as the instability frequency or one of the higher harmonics or sub-harmonic frequencies. Another purpose of this open loop forcing is to sustain controlled oscillations, which are needed for providing feedback to the control loop, once the dominant oscillations at the instability frequencies are suppressed. Either a simple phase-delay approach or a proportional time-delay controller is used for setting up the closed control loop, IN 2 to OUT 2.

A preferred embodiment of the present invention, illustrated in FIGS. 1B and 2C, provides an apparatus 110 for active control modulation of a flame in an air breathing engine combustor having instabilities by injecting pulsed fuel via a plurality of actuators 111 and 112 coupled to a controller 113. These instabilities cause natural oscillations. This preferred system incorporates at least one closed loop actuator 111 and at least one open loop actuator 112. Referring to FIG. 2C, the controller 113 comprises a first means for controlling, IN 2 to OUT 2, and a second means for controlling, OUT 1. The first means for controlling, IN 2 to OUT 2, is operatively coupled to the closed loop actuator 111 and responsive to said sensor 13. The second means for controlling, OUT 1, is operatively coupled to the open loop actuator 112. The first means for controlling prompts the closed loop actuator 111 to periodically inject pulsed fuel into the combustor 10. Preferably, the pulsed fuel is injected into the shear layer 16. The pulsed fuel of the closed loop actuator 111 modulates the natural oscillations of the combustor 10 to produce pressure oscillations in the combustor 10 to control the amplitude of the pressure oscillations. The second means for controlling prompts the open loop actuator 112 to periodically inject pulsed fuel into of the combustor 10. Preferably, the pulsed fuel is injected into the shear layer 16. The pulsed fuel of the open loop actuator 112 modulates the natural oscillations of the combustor 10 to produce the modulated pressure oscillations in the combustor 10. The open loop actuator 112 periodically injects pulsed fuel into the combustor 10 at a driving frequency. The driving frequency may be a harmonic or sub-harmonic frequency of the instability frequency of the combustor 10. The sensor 13 is connected to the combustor 10 down stream from the inlet 14. The sensor 13 generates a sensor signal truly reproducing the pressure oscillations in the combustor 10. In a more preferred embodiment of the present invention the number of closed loop actuators 111 equals the number of open loop actuators 112. However, the number of closed loop actuators 111 may be greater than or less than the number of open loop actuators 112. Also, any number of angles and positions for the actuators 111 and 112 may be incorporated to produce the desired tailored conditions.

Referring to FIG. 2C, in a more preferred embodiment of the present invention, the first means for controlling, IN 2 to OUT 2, is illustrated. A bandpass filter 21 operatively coupled to the sensor 13 and the sensor 13 relays the instability frequency to the bandpass filter 21. The bandpass filter 21 prevents passage of any signal outside the frequency range containing the instability frequency. A first amplifier 22 is operatively coupled to the bandpass filter 21. A time delay circuit 23 is operatively coupled to the first amplifier 22. A voltage comparator 27 is operatively coupled to the time delay circuit 23 and the voltage comparator 27 is operatively coupled to at least one closed loop actuator 111. The second means for controlling, OUT 1, is an open loop controller. The open loop controller is a signal generator 28 and a second amplifier 29. The signal generator 28 generates the driving frequency and the second amplifier 29 is operatively coupled to the signal generator. The second amplifier is operatively coupled to at least one open loop actuator 112.

Figure 4:
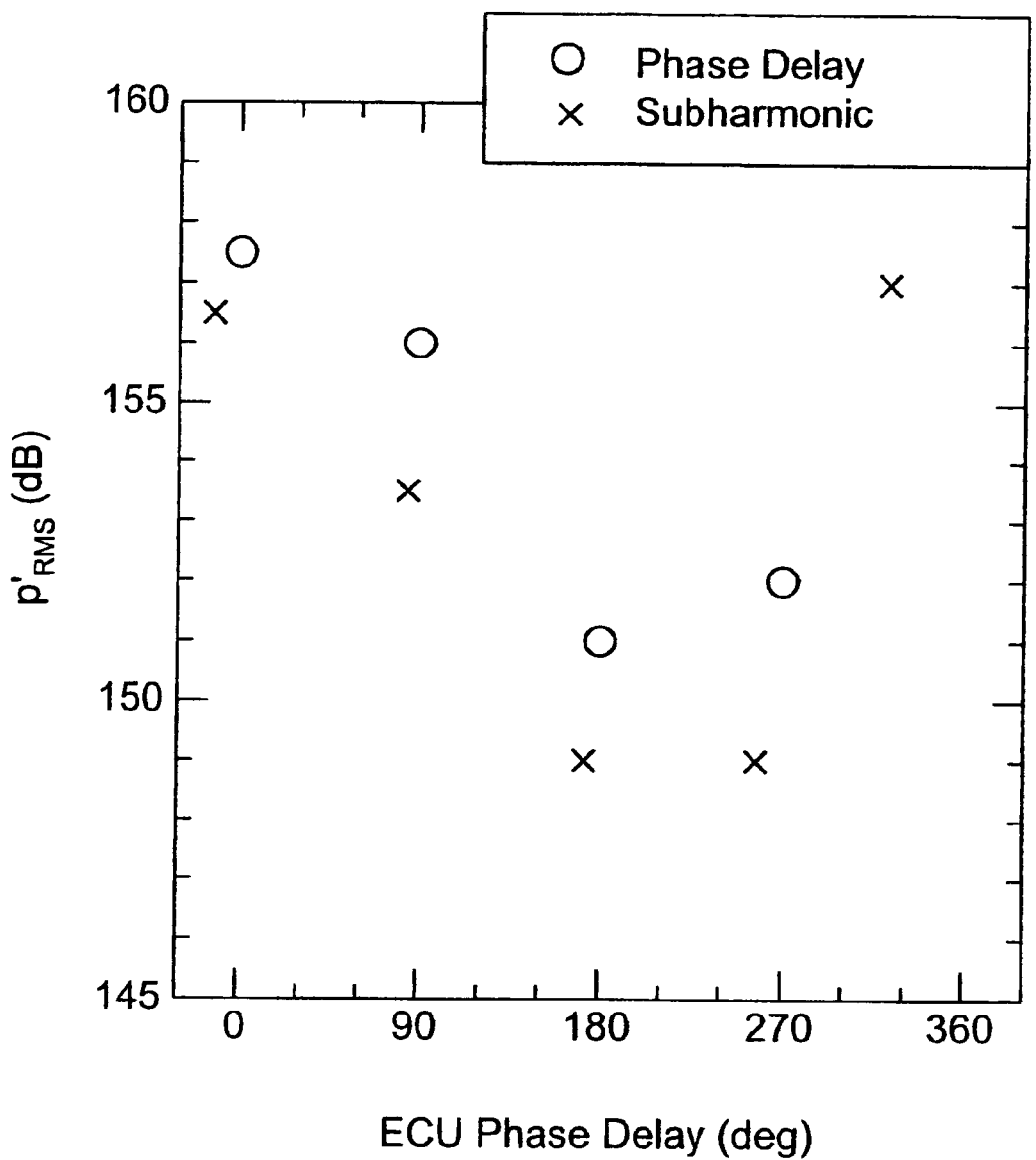
FIG. 4 is a graph that illustrates the performance of a preferred embodiment of the present invention using pacemaker controller actuation to suppress the instability amplitude expressed in terms of instability p' as a function of controller electronic phase delay.

FIG. 4 shows the effect of the closed-loop controller in the pacemaker embodiment, illustrated in FIG. 2C. The instability amplitude is effectively suppressed with the closed-loop control, and the sub-harmonic injection works just as effectively in the pacemaker system, which combines both closed loop and open loop concepts.

EXPERIMENTAL RESULTS

The experiments were performed in a 102-mm diameter axisymmetric dump combustor with adjustable inlet and nozzle dimensions, as illustrated in FIG. 1. The inlet tube was 42 mm in diameter (ID) and the length was between 20 to 60 diameters. Table 1 summarizes the combustor and inlet dimensions for several different cases that were tested. The main fuel, ethylene, was injected through a choked orifice at a 90-degree angle to the oncoming flow. The injection location was 16 inlet diameters upstream of the dump plane causing the inlet flow to be well-mixed entering the combustor. Relatively small amount of liquid fuel was injected directly into the combustor using pulsed fuel actuators. The pulsed fuel injection was closed-loop controlled to affect the dynamics of the reacting flow. FIGS. 1 and 2A through 2C illustrate the control system architecture that was used to control the fuel injection scheduling into the dump combustor.

The liquid fuel is injected through the four fuel actuators that were spaced 90 degrees apart along the circumference of the inlet at the dump plane. The initial injection angle was fixed at 45 degrees with respect to the air flow direction after a parametric study that investigated the most desirable angle for this set of actuators in utilizing flow-droplet interaction. However, the number and spacing of actuators should not be considered a limiting factor. Further, another set of actuators that utilized air-assisted atomization mechanism was explored to investigate the effect of droplet size on combustion control ability. The first set of actuators was a combination of "off-the-shelf" automotive fuel injectors and swirl-based atomizers with 300 μm exit diameter. Such a combination allowed reasonably small fuel droplet size with relatively high frequency response. The second set of actuators consisted of prototype pulsed fuel injectors, that utilized air-assisted atomization mechanism. The latter injectors produced much finer droplets but their frequency response was limited to below 150 Hz.

The "Output 1" in FIG. 2C was used to drive one-half of the injectors at the driving frequency $f_0$, which was one of either harmonic or sub-harmonic frequencies of the instability. Then, a second set of controller was used in a closed-loop fashion to control the amplitude of oscillations. The closed-loop controller in the experiments is based on time-delayed proportional control concept.

A Kistler™ pressure transducer, mounted at one inlet diameter downstream of the dump plane, was used to detect the oscillations in combustor pressure. Then, with the combustor pressure signal as reference, the phase shift for the injection cycle was digitally controlled using a Wavetek™ Variable Phase Synthesizer.

The controller of the pacemaker embodiment utilized a proportional time-delay control strategy. The triggering amplitude was set up so that the duration of the closed-loop pulsed injection was dependant on the instability amplitude. As the instability amplitude grew, the duty cycle of fuel injection increased. The pacemaker embodiment using the proportional time-delay controller is illustrated in FIG. 2C. The closed-loop actuator stopped injecting fuel when the oscillation amplitude was pushed below a certain level. Because the stability is at most marginal at the chosen operating condition, pressure oscillations can grow unexpectedly at any instant. The closed-loop controller turns on when the instantaneous pressure oscillation amplitude exceeds a certain limit, which is preset. Onset of such unstable oscillations was suppressed effectively using this approach.

When an active combustion control technique is properly applied, it can not only suppress unwanted oscillations but it can also extend the flammability limit. While the pacemaker embodiment of the present invention was not able to suppress fully-blown high-amplitude instabilities in the middle of the unstable zone, it was able to control moderate-amplitude instabilities near the edge of the unstable zone. Consequently, the unstable zone became narrower as the stable zone was expanded. Also, the lean flammability limit was extended much beyond the typical blowoff limit of the premixed flames, which occurs around the equivalence ratio of 0.5.

While a specific embodiment has been shown and described, many variations are possible. Those persons skilled in the art will appreciate that certain modifications may be made to the invention without departing from its spirit, therefor it is not intended that the scope of the invention be limited to the specific embodiment illustrated and described. Rather, it is intended that the scope of this invention be determined by the appending claims and their equivalents.

What is claimed is:

1. A method of active control modulation of a flame in a combustor having an instability frequency by injecting pulsed fuel via a plurality of actuators having at least one closed loop actuator and at least one open loop actuator, comprising:

feeding a fluid flow into said combustor through an inlet, wherein instabilities in said combustor produce natural oscillations in the fluid flow;

generating a signal detecting the pressure oscillations within said combustor;

engaging a closed loop control device operatively to said at least one closed loop actuator and responsive to a sensor, wherein said closed loop control device prompts the closed loop actuator to inject the pulsed fuel into a shear layer of said combustor;

injecting the pulsed fuel from the closed loop actuator into said combustor, wherein the pulsed fuel from said closed loop actuator controls the amplitude of the pressure oscillations in said combustor by modulating the natural oscillations;

engaging an open loop control device operatively coupled to said at least one open loop actuator, wherein said open loop control device prompts said at least one open loop actuator to inject pulsed fuel into said combustor at a driving frequency; and injecting pulsed fuel from said open loop actuator into said combustor at said driving frequency.

2. The method of claim 1 wherein said driving frequency comprises one or more sub-harmonic frequencies of said instability frequency of said combustor.

3. The method of claim 1 wherein said driving frequency comprises a harmonic frequency of said instability frequency of said combustor.

4. The method of claim 1 wherein the number of closed loop actuators is equal to the number of open loop actuators.

5. The method of claim 1 wherein the number of closed loop actuators is greater than the number of open loop actuators.

6. The method of claim 1 wherein the number of closed loop actuators is less than the number of open loop actuators.

7. An apparatus for active control modulation of a flame in a combustor having instabilities, wherein the instabilities cause natural oscillations, by injecting pulsed fuel, comprising:

at least one closed loop actuator, wherein said at least one closed loop actuator periodically injects pulsed fuel into said combustor;

at least one open loop actuator, wherein said at least one open loop actuator periodically injects pulsed fuel into said combustor;

a sensor connected to said combustion chamber down stream from an inlet, wherein said sensor generates a signal detecting the pressure oscillations in said combustor;

a first means for controlling operatively coupled to said at least one closed loop actuator and responsive to said sensor, wherein said first means for controlling prompts said at least one closed loop actuator to periodically inject pulsed fuel into said combustor and wherein said first means for controlling controls the amplitude of the pressure oscillations in said combustor by modulating the natural oscillations; and a second means for controlling operatively coupled to said at least one open loop actuator, wherein said second means for controlling prompts said at least one open loop actuator to periodically inject pulsed fuel into said combustor at a driving frequency.

8. The apparatus of claim 7 wherein the number of closed loop actuators equals the number of open loop actuators.

9. The apparatus of claim 7 wherein the number of closed loop actuators is greater than the number of open loop actuators.

10. The apparatus of claim 7 wherein the number of closed loop actuators is less than the number of open loop actuators.

11. The apparatus of claim 7 wherein said driving frequency comprises one or more sub-harmonic frequencies of the instability frequency of said combustor.

12. The apparatus of claim 7 wherein said driving frequency comprises a harmonic frequency of said instability frequency of said combustor.

13. The apparatus of claim 7 wherein said first means for controlling comprises a closed loop controller.

14. The apparatus of claim 13 wherein said closed loop controller comprises:

a bandpass filter operatively coupled to said sensor, wherein said sensor relays the instability frequency to said bandpass filter and said bandpass filter prevents passage of any signal outside the frequency range containing said instability frequency;

a first amplifier operatively coupled to said bandpass filter;

a time delay circuit operatively coupled to said amplifier; and a voltage comparator operatively coupled to said time delay circuit, wherein said voltage comparator is operatively coupled to said at least one closed loop actuator.

15. The apparatus of claim 7 wherein said second means for controlling comprises an open loop controller.

16. The apparatus of claim 15 wherein said open loop controller comprises:

a signal generator, wherein said signal generator generates said driving frequency; and a second amplifier operatively coupled to said signal generator, wherein said amplifier is operatively coupled to said at least one open loop actuator.

* * * * *